Aug. 30, 1966 D. J. BUNGER ET AL 3,269,408
PRESSURE REGULATOR FOR BATH HIGH AND LOW FLOW DEMANDS
Filed Oct. 29, 1963
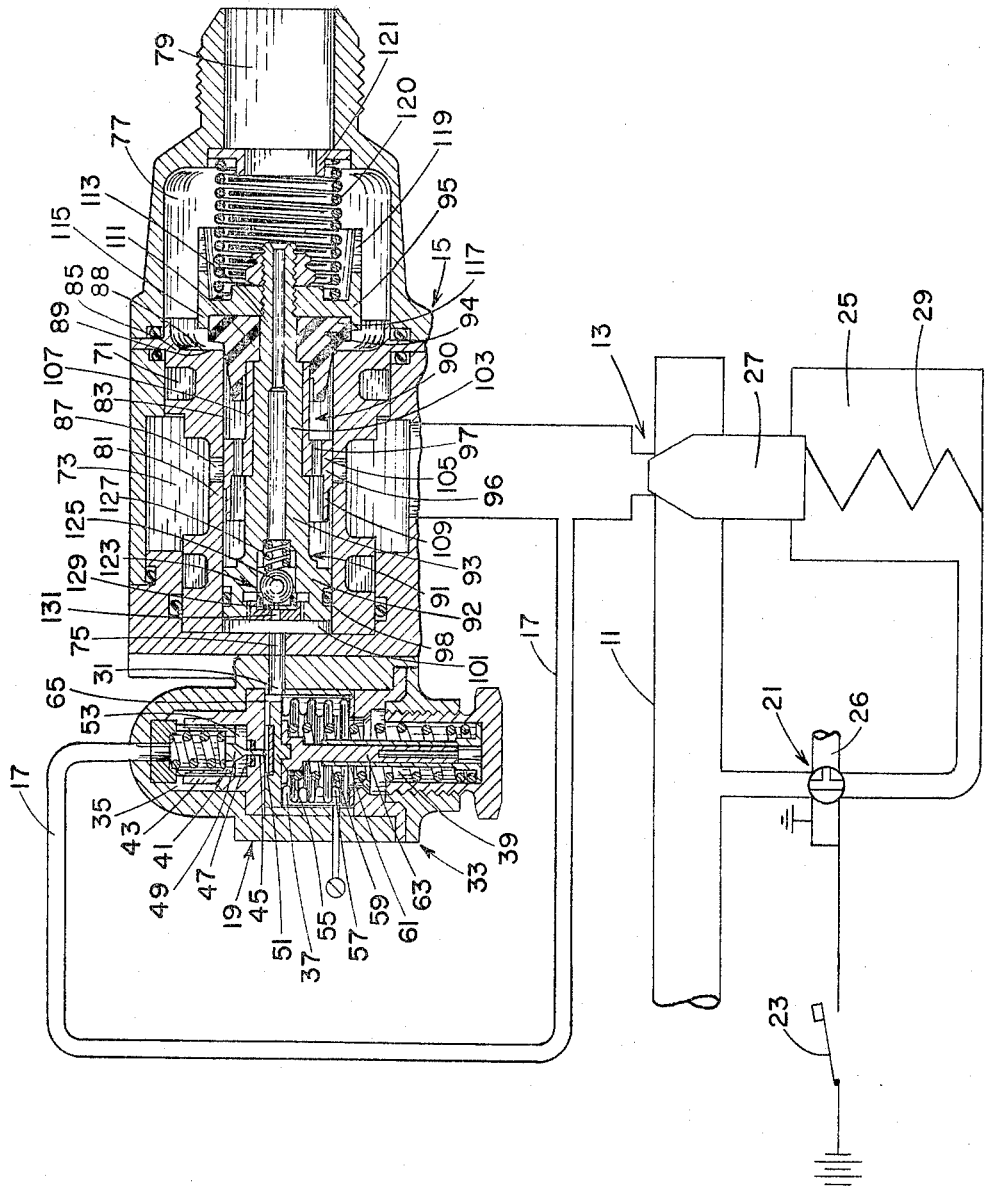
INVENTORS
DENNEN J. BUNGER
NEMJEE R. CHHEDA
JOHN H. FERGUSON
BY Robert W. Ely
ATTORNEY United States Patent Office 3,269,408
Patented August 30, 1966

3,269,408
PRESSURE REGULATOR FOR BOTH HIGH AND LOW FLOW DEMANDS
Dennen J. Bunger, Whitesboro, Nemjee R. Chheda, Utica, and John H. Ferguson, Sauquoit, N.Y., assignors to The Bendix Corporation, Utica, N.Y., a corporation of Delaware
Filed Oct. 29, 1963, Ser. No. 319,791
1 Claim. (Cl. 137—517)

This invention relates to the pressure regulation of a gas and more particularly concerns a pressure regulating system which provides regulation of very high pressure gas over a wide range of flows.

Prior valves such as shown in U.S. Patent No. 2,963,039 provided adequate regulation at relatively high flows but became erratic at very low flows. In some applications, there is a need to provide regulation and shut-off of high pressure gas and at high flow demands and at extremely low flow demands, approximating zero flow.

An object of the present invention is to provide an improved pressure regulating system which overcomes the above-noted disadvantage to provide regulation of a high pressure gas over a wide range of flow demands down to almost zero flow.

A further object is to provide such a system wherein a pilot valve gives a constant pressure for controlling a pressure regulator and wherein means permit reliable sealing when minimum (near zero) flow is demanded.

Another object is the provision of a pressure regulating system having piloted reference pressure chamber and means therefrom permitting the control element to hunt more freely to establish the predetermined regulated pressure with maintenance of the piloted reference pressure.

An additional object is the provision of a pressure regulator having an improved nylon ring in a control element for sealing and improved relief means in the control element connecting a constant reference pressure chamber to the discharge chamber.

The realization of the above objects, along with the features and advantages of the invention will be apparent from the following description and the accompanying drawing.

The drawing is partially schematic showing with a cross-section of a pilot valve and pressure regulator and shows an axially-moveable control element (in the large-diameter regulator) having a nylon seating ring and a check-valved axial passage.

Referring to the drawing, the air or gas supply pipe 11 has an on-off valve 13 upstream of the pressure regulator 15. A branch pipe 17 connects into pipe 11 between the on-off valve 13 and the regulator 15 and leads to the pilot valve 19.

A two-way solenoid control valve 21 operated by switch 23 opens the schematically-shown, on-off valve 13 by venting the chamber 25 through vent 26. Plunger 27 moves against spring 29. Pressure on the top of the plunger 27 causes this operation. Closing is effected by de-energizing two-way valve 21 so that it returns to the non-venting position as shown whereby pressure on the bottom of plunger 27 together with spring 29 overcomes the pressure on the top of the plunger 27.

When control valve 21 is open, air moves to pilot valve 19 via branch pipe 17. Pilot valve 19 reduces the pressure and gives a fixed balancing or reference pressure in its outlet 31. The pilot valve housing 33 provides an upper valve chamber 35, a middle diaphragm chamber 37, and a lower spring chamber 39. A spring-biased tubular piston valve element 41 is received in guide 43 having circular outlet 45 with its plastic valve seat 47. Valve element 41 has a conical seating extension 49 for sealing against seat 47. A rod 51 projects from conical extension 49 through outlet 45. Piston valve element 41 has passages 53 outward of conical extension 49 for flow from pipe 17 to the annular passage between rod 51 and outlet 45.

Rod 51 abuts a plate device 55 biased upward by sealed bellows 57 and spring 59 which surrounds a tubular guide 61 receiving the downward plate extension 63.

Plate 55 has a plurality-transverse passage 65 for flow from outlet 45 to outlet 31. It is apparent that pilot valve 19 will provide a predetermined reference or balancing pressure depending on the forces derived from spring 59 and the pressure effect on bellows 57 due to surrounding gas. With pressure approaching a predetermined limit, bellows 57 will be contracted to seat conical extension 49 on nylon ring seal 47. A decrease in pressure permits the spring-biased bellows 57 to urge the valve element 49 upwardly.

The pressure regulator 15 has housing means which provides an axial chamber 71 with a surrounding annular inlet recess 73, an inlet passage 75 connected to pilot valve outlet 31, an outlet chamber 77 and a discharge passage 79. Inlet recess 73 connects to supply pipe 11 downstream of on-off valve 13. A sleeve 81 fits into axial chamber 71 and provides cylindrical valve chamber 83. The larger right end 85 has dished recess 88 opening into the outlet chamber 77. Sleeve 81 has a plurality of transverse ports 87 which connect inlet recess 73 to the interior of sleeve 81. The right inner edge 89 of sleeve 81 forms the valve seat for the regulator 15 of the pressure reducing system.

A valve element 90 has piston element 91 with its piston 92 and its rightwardly-extending mounting extension 93, a tapered plastic seating element 94 mounted in support ring 95, and a control sleeve 96 having axial ports 97.

It is to be noted that the piston 91 has an O-ring seal 98 and cooperates with the housing means and the left end of sleeve 81 to provide a balancing pressure chamber 101. The valve element mounting extension 93 has first reduced-diameter part 103 carrying the control sleeve 96. Sleeve 96 includes a central disc 105, a rightward extending inner tubular part 109 mounted on piston part 103, and leftward-extending reduced diameter throttle sleeve 109. The outer surface of disc 105 normally closes off the inlet ports 87 of sleeve 81. The nylon tapered valve ring 94 rides partially on part 107 and has a radially-inwardly-projecting annulus 111 which fits on the small diameter terminal part 113 of the piston extension 93. The left annular face of valve ring 94 abuts the right end of sleeve 107 and the right end of intermediate section 103 of piston extension 93.

Valve element support ring 95 is threaded on the terminal part 113 of the piston extension 93 and its cup 115 fits the right cylindrical ring part 117 of plastic valve ring 94 which connects to largest-diametered tapered part of the valve ring 94.

The support ring 95 also has rightwardly-extending projections 119 which retains the left end of spring 120. It is to be noted that the spring 120 exerts a force on a diameter approximately equal to the diameter of the regulator valve seat 89. The right end of the spring 120 is retained in housing means by a lipped washer 121. It is to be noted the throttle sleeve 109 and the surface of the tapered part of plastic valve ring 94 with edge 89 both provide throttling or a pressure reducing function.

The piston element 91 has axial passage means which includes a reverse flow check valve 123 having a spring-biased ball 125, spring 127, and plastic annular seat 129 at a small port 131. The seat 129 may also be formed of other synthetic materials such as nylon.

In operation, it is apparent from the foregoing, how the on-off control of the pressure reducing system is actuated by closing switch 23 so that on-off valve 13 is opened.

It is also believed to be clear from the above description how the pilot valve 19 provides a constant balancing or reference pressure to regulator reference chamber 101 to the left of the piston 92. The cooperation among the adjustable, spring-biased bellows 57 and the spring-biased valve element 41 having rod 51 abutting the bellows plate 37 and further having conical part 49 variably positioned in relation to the nylon annular valve seat 47 reliably provides a constant reference pressure by regulating the pressure of the supply air supplied by branch pipe 17 connected to main flow pipe 11. Typically, the pilot valve reduces air with a pressure from 500 p.s.i.g. to about 3,000 p.s.i.g. down to 450 p.s.i.g.

The reference pressure in chamber 101 acts to push the piston 91 to the right so that high pressure gas from ports 87 is throttled by skirt 109 and the annular passage between the tapered nylon valve ring 94 and edge 89 to give the desired predetermined discharge pressure (400 p.s.i.g.) in discharge chamber 77.

If the pressure exceeds the predetermined value, the discharge pressure force aids spring 120 to increase the throttling and at times, to shut off the regulator 15 by the reliable seating of nylon tapered valve ring 94 on edge 89 and disc 105 blocking ports 87. With the tapered valve ring 94 and edge 89 giving a tight seal even under small-travel rapid oscillating conditions, a slight clearance at blocking disc 105 does not affect regulation. The dual throttle construction necessary for high flows (0.3#/sec.) thus is adapted to cooperate at near-zero flows derived from a high pressure source to give precise regulation. If downstream pressure falls below a predetermined value, the constant reference pressure in chamber 101 overcomes spring 120 to open ports 87 and increase the annular passage between nylon valve ring 94 and valve edge or seat 89, increasing flow and hence, pressure. The check valve 123 permits the regulator control element to hunt freely to establish the predetermined regulated pressure, since the check valve 123 relieves chamber 101 upon leftward movement to the desired constant value.

It is to be noted that the tapered valve ring construction gives a positive seal at near-zero flow and that, at high flows, the skirt arrangement and the tapered construction cooperate to give a constant downstream pressure, both low and high flows being derived from inlet pressure range of 500 to 3,000 p.s.i.g.

It is to be understood that persons skilled in the art can make changes in the described system without departing from the invention as set forth in the following claim.

What is claimed is:

A pressure regulator for low flow of a gas comprising:
housing means providing an axial bore which terminates at one end in a circular seat having a sharp edge and at the other end with a wall and having a discharge chamber extending from said seat edge in a direction away from said wall;
a valve element having a piston slidably sealingly mounted in said bore adjacent said wall to form a reference pressure chamber and having a tapered plastic valve ring spaced from said piston and arranged to seal said seat edge;
said housing having inlet means providing a flow path to said axial bore between said piston and said seat edge;
a pilot pressure reducing valve in communication with said inlet means and said reference pressure chamber to maintain a predetermined constant reference pressure in said reference pressure chamber;
axial passage means through said valve element communicating said reference pressure chamber to said discharge chamber including a check valve arranged to sense both reference pressure and discharge pressure and to provide flow from said reference pressure chamber to said discharge chamber when said valve element moves toward said wall of said bore;
said check valve including a small port surrounded by a plastic seat and a ball normally spring biased into contact with said seat;
spring means biasing said valve element toward closed position;
said valve element further including an axially-extending skirt, a supporting and blocking disc connected thereto and passages through said disc;
said inlet means terminating in ports on said bore positioned to be blocked by said disc when said valve element is in a valve closed position;
said skirt dimensioned to provide with said bore an annular throttling passage when said inlet ports are unblocked by said disc; and
said piston and said spring means operative to control said valve ring relative to said seat edge upon a predetermined pressure differential existing between said discharge chamber and said reference pressure chamber such that substantially no fluid flows through said pressure regulator.

References Cited by the Examiner

UNITED STATES PATENTS

| | | | |
|---|---|---|---|
| 285,163 | 9/1883 | Ross | 137—505.11 X |
| 2,768,643 | 10/1956 | Acomb | 137—505.42 |
| 2,841,173 | 7/1958 | Mason | 137—505.18 |
| 2,922,432 | 1/1960 | Huntington | 137—539 X |
| 2,963,039 | 12/1960 | Dietz | 137—494 |
| 3,139,901 | 7/1964 | Camp | 137—505.18 |

FOREIGN PATENTS

| | | |
|---|---|---|
| 907,853 | 10/1962 | Great Britain. |
| 526,625 | 5/1955 | Italy. |

WILLIAM F. O'DEA, *Primary Examiner.*

ISADOR WEIL, *Examiner.*

H. W. WEAKLEY, *Assistant Examiner.*